United States Patent [19]

Ohno et al.

[11] Patent Number: 5,831,083
[45] Date of Patent: Nov. 3, 1998

[54] PRODUCTION METHOD OF BETA-TYPE COPPER PHTHALOCYANINE PIGMENT

[75] Inventors: Kouji Ohno; Akemi Kanai, both of Kashima-gun; Toshio Takei, Kashima, all of Japan

[73] Assignee: Dainippon Ink and Chemicals, Inc., Tokyo, Japan

[21] Appl. No.: 778,500

[22] Filed: Jan. 3, 1997

[30] Foreign Application Priority Data

Jan. 8, 1996 [JP] Japan .................................. 8-000737

[51] Int. Cl.⁶ .................................................. C09B 67/50
[52] U.S. Cl. .......................... 540/141; 540/142; 540/144
[58] Field of Search .................................... 540/141, 142, 540/144

[56] References Cited

U.S. PATENT DOCUMENTS

| 2,556,727 | 6/1951 | Lane et al. | 260/314.5 |
| 5,281,268 | 1/1994 | Ide et al. | 106/410 |
| 5,449,774 | 9/1995 | Lambie et al. | 540/141 |

FOREIGN PATENT DOCUMENTS

| 0 266 219 A2 | 5/1988 | European Pat. Off. . |
| 0 571 776 A2 | 12/1993 | European Pat. Off. . |
| 0 574 790 A1 | 12/1993 | European Pat. Off. . |
| 0 739 951 A1 | 10/1996 | European Pat. Off. . |
| 1 280 422 A | 12/1961 | France . |
| 48-75627 | 10/1973 | Japan . |
| 61-203175 | 9/1986 | Japan . |
| 63-207858 | 8/1988 | Japan . |
| 6-80898 | 3/1994 | Japan . |
| 6-228449 | 8/1994 | Japan . |
| 8-134368 | 5/1996 | Japan . |

OTHER PUBLICATIONS

Database WPI; Derwent Publications Ltd.; London, GB; Week 7422 AN 74–40536V.

"Preparation of Copper Phthalocyanine Pigment", Shinichi et al.; Publication No. 05125289; May 21, 1993 (Patent Abstract of Japan).

Database WPI; Section Ch, Week 8642; Derwent Publications; London, GB, AN 86–276575.

*Primary Examiner*—Mukund J. Shah
*Assistant Examiner*—Pavanaram K. Sripada
*Attorney, Agent, or Firm*—Armstrong, Westerman, Hattori,McLeland & Naughton

[57] ABSTRACT

A production method of beta-type copper phthalocyanine pigment comprising steps of: a) producing a reaction mixture containing crude copper phthalocyanine in an organic solvent; b) wet-grounding the reaction mixture by mechanical energy to form a suspension; c) removing the organic solvent from the obtained suspension does not contaminate the work environment and represents an improvement in terms of both productivity and economic savings compared with conventional methods. The beta-type copper phthalocyanine pigment produced by this method demonstrates excellent dispersability, such that it may be dispersed without further modification in a resin, varnish, plastic or other medium as required, to produce a paint, ink, or plastic tinting agent, for example.

21 Claims, No Drawings

PRODUCTION METHOD OF BETA-TYPE COPPER PHTHALOCYANINE PIGMENT

BACKGROUND OF THE INVENTION

1. Field of the Invention

The present invention relates to a production method of beta-type copper phthalocyanine pigment which is highly economical, offers superior productivity, and will not contaminate the work environment. Furthermore, the beta-type copper phthalocyanine pigments produced by the method of this invention have excellent dispersability.

2. Description of the Related Art

Copper phthalocyanine pigment, which exhibits brilliance of shade, high tinctional strength, weather resistance, heat stability, chemical stability, and other stability in general, is widely used as blue coloring matter in the coloring materials industry.

There are a variety of known methods for producing crude copper phthalocyanine, including: 1) a method in which phthalonitrile and copper or its compounds are reacted by heating at a temperature in the range of 180° to 300° C. in the presence or absence of an inert organic solvent; and 2) a method in which phthalic anhydride or its derivatives, copper or its compounds, and urea or its derivatives, are reacted in the presence of a catalyst by heating at a temperature in the range of 180° to 300° C. in the presence or absence of an inert organic solvent. The crude copper phthalocyanine obtained by these methods consists of large particles in order of several microns to several tens of microns in length. Used without further modification, the crude copper phthalocyanine has very low tinctional strength and is quite dull in shade. Accordingly, since it has little value as a coloring matter in this case, the conditioning process is necessary to give pigments.

The conditioning process for crude copper phthalocyanine will differ depending on whether alpha-type copper phthalocyanine pigment or beta-type copper phthalocyanine pigment is to be produced. The most widely described production method of beta-type copper phthalocyanine pigment is carried out by mechanical-grinding crude beta-type copper phthalocyanine together with aqueous inorganic salts in a ball mill, kneader, or the like.

However, there are several problems in these processes, which consume considerable energy and a long processing time, while the productivity thereof is poor. In addition, these methods contain other problems such as the need to recover the grinding assistants such as salt, treat high COD waste water, etc., which give economical disadvantage.

Japanese Patent Application Laid Open Numbers Sho 61-203175 and Sho 63-207858 have disclosed the methods to resolve the above problems. Namely, the inventions disclosed in these applications propose the production method of copper phthalocyanine pigment in a single step by adding a small amount of trimellitic anhydride, pyromellitic anhydride, or their derivatives in the stage of producing the crude copper phthalocyanine.

While the copper phthalocyanine pigment obtained by these methods have a specific surface area corresponding to the pigments, however, dispersability of the pigments is poor because the pigment particles remarkably agglomerate with each other.

The specification of U.S. Pat. No. 2,556,727 has disclosed wet grinding the isolated and dried crude phthalocyanine, which comprises subjecting the same to ball milling with grinding media not greater than 0.25 inches in diameter and an organic solvent, following then separating from the pigment by distillation or steam distillation.

However, in the method presented by this patent, crude phthalocyanine which has been isolated, washed, and dried must be submitted to wet grinding and for a long period of time in a ball mill to produce a finely divided pigment. In addition, the ground pigment tends to cause crystal growth during the wet grinding. Accordingly, while this method may be appropriate for crude copper phthalocyanines which do not readily cause crystal growth, such as partially chlorinated or polychlorinated crude phthalocyanine or metal-free phthalocyanines, it is not appropriate for ordinary phthalocyanines. Furthermore, in order to strongly prevent this type of crystal growth, it becomes necessary to employ a low boiling point solvent or a solvent which does not readily give rise to crystal growth. Accordingly, general application of this method is problematic. In addition, there are productive and economical disadvantages in this method because this method requires the operating a ball mill for several days to obtain a finely divided pigment.

SUMMARY OF THE INVENTION

In order to resolve the above described problems, the present invention proposes a production method of beta-type copper phthalocyanine pigment which offers excellent productivity, is highly economical, and will not contaminate the work environment. Furthermore, the beta-type copper phthalocyanine pigment produced by this method has excellent dispersability.

After extensive research aimed at resolving the above-described problems, the present inventors discovered a production method of a beta-type copper phthalocyanine pigment, which is advantageous from a manufacturing perspective.

In other words, the present invention provides a production method of beta-type copper phthalocyanine pigment characterized in that the method comprises the steps of: producing a reaction mixture containing crude copper phthalocyanine and the organic solvent; wet grinding the reaction mixture by mechanical energy which reduces the particle size of the crude copper phthalocyanine to form a suspension; and removing the organic solvent from the obtained suspension.

The present invention's production method of beta-type copper phthalocyanine pigment does not contaminate the work environment and represents an improvement in terms of both productivity and economic savings compared with conventional methods. Furthermore, the beta-type copper phthalocyanine pigment produced by this method demonstrates excellent dispersability, such that it may be dispersed without further modification in a resin, varnish, plastic or other medium as required, to produce a paint, ink, or plastic tinting agent, for example.

PREFERRED EMBODIMENTS OF THE PRESENT INVENTION

The production method of the present invention will now be explained in detail as follows.

(1) First, a reaction mixture containing crude copper phthalocyanine and the organic solvent used in the reaction is produced by reacting phthalic anhydride or its derivatives, copper or its compounds, urea or its derivatives, and, as necessary, an aromatic polybasic carboxylic acid or its derivatives represented by general formula (I) below are reacted by heating with a catalyst in an inert organic solvent.

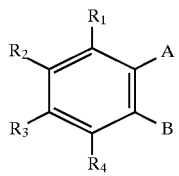

(where: R1~R4 are each independently one compound selected from the group consisting of hydrogen atom, carboxyl group, alkoxy carbonyl group, carbamoyl group or carboxylate group, with at least one of R1~R4 being a carboxyl group, alkoxy carbonyl group, carbamoyl group or carboxylate group, wherein when 2 or more of these groups are adjacent to one another, they may cyclize to form an imide or anhydride; and A and B independently represent a carboxyl group, alkoxy carbonyl group, carbamoyl group, carboxylate group or nitrile group, wherein A and B may cyclate to form an imide or anhydride.)

(2) Next, the reaction mixture may be charged into a vessel having shearing action, such as a dissolver, and thereby dispersed. In this case, as necessary, the organic solvent used in the production of crude copper phthalocyanine reaction mixture can be added.

(3) The suspension obtained in (2) above is then subjected to wet grinding to produce a suspension of beta-type copper phthalocyanine pigment.

(4) Finally, the beta-type copper phthalocyanine pigment is isolated from the suspension obtained in (3) above by a conventional method.

In (4) above, isolation means a step for washing and drying of the pigment.

The beta-type copper phthalocyanine pigment obtained by the present production method reduces less aggregates and consequently has better dispersibility than pigments produced by conventional methods. Moreover, pigmentary properties are improved by adding copper phthalocyanine derivatives, which have an alkyl amino group, or a carboxyl group or sulfonic group which may be neutralized using alkaline metal ion, alkaline earth metal ion or ammonium ion, as disclosed in Japanese Patent Application Laid Open No. Hei 6-80898, in steps (2), (3) or (4) above.

There are variety of methods for producing crude copper phthalocyanine, including: (1) a method using phthalonitrile as a starting material and reacting in an inert organic solvent; and (2) a method using phthalic acid or its derivative as a starting material and reacting in an inert organic solvent. In the case of using phthalonitrile, however, it is industrially disadvantageous because it is not only expensive, but also requires special care in handling for environmental health.

It is preferable to use phthalic acid or its derivatives as the starting material for producing the crude copper phthalocyanine reaction mixture used in the present invention by one of the widely known methods in various references. Among these, it is preferable to use the crude copper phthalocyanine reaction mixture disclosed in Japanese Patent Application Laid Open No. Sho 61-203175, which is obtained by reacting phthalic acid or its derivatives, copper or its compounds, urea or its derivatives, and an aromatic polybasic carboxylic acid or its derivatives represented by general formula (I) below with a catalyst by heating in an organic solvent.

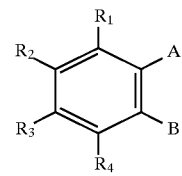

(Where: R1~R4 are each independently one compound selected from the group consisting of hydrogen atom, carboxyl group, alkoxy carbonyl group, carbamoyl group, and carboxylate group, with at least one of R1~R4 being a carboxyl group, alkoxy carbonyl group, carbamoyl group or carboxylate group, wherein when 2 or more of these groups are adjacent to one another, they may cyclize to form an imide or anhydride; and A and B independently represent a carboxyl group, alkoxy carbonyl group, carbamoyl group, carboxylate group or nitrile group, wherein A and B may cyclate to form an imide or anhydride.)

The phthalic acid and its derivatives which are used in the production of crude copper phthalocyanine are not particularly restricted and may be used the various compounds which are applicable in the production of phthalocyanine compounds. For example, the phthalic acid or its derivatives include phthalic acid, or salts or esters thereof, phthalic anhydride, phthalimide, phthalic acid, or salts and esters thereof, phthalonitrile, and the like. Further, the compounds of their aromatic ring substituted by chlorine atom, bromine atom, alkyl group, phenyl group, or sulfonic group may be used instead of these compounds. However, phthalic anhydride is most preferable among phthalic acid and its derivatives due to its ease of acquisition in the case of production on an industrial scale, its safety on a human body, and the excellent yield of crude copper phthalocyanine obtained.

In consideration of cost and acquisition in the case of production on an industrial scale, the aromatic polybasic carboxylic acids represented by the general formula (I) which are preferably used in place of a portion of the phthalic acid and its derivatives when producing crude copper phthalocyanine include aromatic polybasic carboxylic acids such as trimellitic acid and pyromellitic acid; and their derivatives like aromatic polybasic carboxylic anhydrides such as trimellitic anhydride and pyromellitic anhydride, aromatic polybasic carboxylic imides such as 4-carbamoyl phthalimide and pyromellitimide, aromatic polybasic carboxylic esters such as trimellitic alkyl ester and pyromellitic alkyl ester, or the like. Moreover, these may be used alone or in combination.

In case of using the aromatic polybasic carboxylic acid or its derivatives represented by general formula (I) to produce crude copper phthalocyanine, the molar ratio between total phthalic acid and its derivatives used and total aromatic polybasic carboxylic acid and its derivatives used is preferably in the range of 90:10 to 99.7:0.3, and more preferably in the range of 95:5 to 99.7:0.3. While the usage molar ratio will vary somewhat depending on the type of aromatic polybasic carboxylic acid or derivatives thereof used, it is preferable that this proportion have a value such that the specific surface area of the crude beta-type copper phthalocyanine is in the range of 5~30 $m^2/g$. If the total amount of aromatic polybasic carboxylic acid and its derivatives used exceeds the above-stated molar ratio, the crystals of the obtained copper phthalocyanine become extremely fine, giving rise to remarkable agglomeration. As a result, this is not only inconvenient during wet grinding, but also causes production costs to rise and dull color, and a deterioration in chemical stability and the like. Further, if the total amount of aromatic polybasic carboxylic acid and its derivatives used is less than the above-stated molar ratio, the effect of the compound's addition tends to be decreased.

The copper or its compounds which are used in the production of crude copper phthalocyanine include halides, oxides, sulfates, acetates, carbonates, hydrides, cyanides, phosphates, nitrates, and hydrosulfides of Cu(I) and Cu(II). The amount of these compounds are preferable in the range of 0.8 to 1.3 moles per 4 moles of the total phthalic acid and its derivatives used.

The urea and its derivatives which are used in the production of crude copper phthalocyanine include urea, ammonia and the like. The amount of these compounds are preferable in the range of 4 to 26 moles in ammonia equivalents, per 4 moles of total phthalic acid and its derivatives used.

The organic solvent employed in the production of crude copper phthalocyanine is not particularly restricted. Generally used organic solvents are applicable in this case. Examples include aromatic hydrocarbons like alkyl benzene, alkyl naphthalene, and tetralin; cyclic aliphatic hydrocarbons like alkylcyclohexane, decalin, and alkyl decalin; aliphatic hydrocarbons like decane and dodecane; aromatic nitro compounds like nitrobenzene and o-nitrotoluene; aromatic halogenated hydrocarbons like trichlorobenzene and chlornaphtalene; ethers like diphenyl ether; sulfur compounds like sulfolane, dimethyl sulfoxide, methyl sulfolane, dimethyl sulfolane, N-methyl sulfolane and the like; and heterocyclic compounds like N-methyl pyrrolidone, dimethyl imidazolidinone. Further, a mixture of two or more of these may also be used.

The catalysts to produce crude copper phthalocyanine are not particularly restricted. Examples include molybdenum compounds like ammonium molybdenate, molybdenum oxide, and phosphomolybdic acid; titanium compounds like titanium tetrachloride and titanic ester; zirconium compounds like zirconium chloride and zirconium carbonate; and antimony oxide, arsenic oxide, boric acid and the like. The amount of these catalysts are preferable in the range of 0.01 to 0.04 moles per 4 moles of total phthalic acid and its derivative used.

Wet grinding apparatus capable of providing mechanical energy to the crude copper phthalocyanine reaction mixture include agitator mills, ball mills, pebble mills, sand mills, vibration mills, attrition mills, attritors, pearl mills and the like. A pearl mill is more preferable from among these, however, as it offers high grinding efficiency.

Additionally, while a grinding medium having an average diameter in excess of 1.00 mm may be used for the grinding medium employed in wet grinding, it is preferable that the average diameter of the grinding medium be in the range of 0.10~1.00 mm, and more preferably, in the range of 0.20~0.50 mm. This is because, at these ranges of size, the crude copper phthalocyanine is uniformly ground, with a copper phthalocyanine pigment having the desired tinting strength obtained in a short period of time.

Beads made of glass, ceramic, zirconium, steel or the like may be employed as the grinding medium in the wet grinding process. Of these, however, zirconium beads are preferable because of ease of acquisition and resistance to friction.

The concentration of crude phthalocyanine in the suspension which is suitable for wet grinding depends on the type of organic solvent and on the degree of wet grinding. However, a value in the range of 5 to 40% by weight is preferable, with a value in the range of 10 to 30% by weight even more preferable from the perspective of productivity and workability.

The method for removing the organic solvent from the pigment suspension after wet grinding is not particularly restricted. For example, filtration, distillation under reduced pressure, spray drying, flash distillation, steam distillation, and the like may be employed. However, removal of the organic solvent by means of steam distillation offers several advantages in particular. Namely, the amount of solvent volitized out into the work environment is low in a removal method using steam distillation, and specialized equipment is not necessary. Further, in addition to low energy costs, the pigment is obtained as a aqueous slurry so that subsequent handling is easy. In addition, surprisingly, since removal of the organic solvent is carried out at a temperature of around 100° C. in a steam distillation, crystal growth do not readily occur during the removal of the solvent from the suspension containing wet-ground pigment. Moreover, because the organic solvent on the pigment surface is gradually replaced with water, the dispersability of the pigment after drying is excellent.

In the present invention's method, it is essential that wet grinding be carried out without removing the organic solvent from the crude copper phthalocyanine reaction mixture. The reason for this is not certain, but may be because impurities in the reaction mixture constrain crystal growth of the wet-ground pigment. As a result, the method of the present invention succeeds in resolving the problems set above.

EXAMPLES

The following examples and comparative examples further illustrate the present invention. However, the present invention is not limited in arrange of illustrated examples. In a following examples and comparative examples, all parts and percents are weight unless otherwise specified.

Example 1

122 parts of phthalic anhydride, 154 parts of urea, 20 parts of anhydrous cuprous chloride, 0.5 parts of ammonium molybdenate, and 500 parts of Hyzole P (an aromatic hydrocarbon type organic solvent sold by Nippon Sekiyu KK) were charged into a reaction vessel, and heated with stirring. After raising the temperature to 180° C., the mixture was reacted for 2.5 hours at this temperature. The obtained reaction mixture was cooled to 60° C. and transferred to another vessel having dissolver, where the mixture was diluted with Hyzole P until the concentration of the crude beta-type copper phthalocyanine was reached to 10% with dispersing.

Next, the crude beta-type copper phthalocyanine was wet-ground by passing the suspension obtained above twice through a pearl mill sold by Nippon Eirich KK (PM-DCP12) containing zirconium beads with an average diameter of 0.20 mm.

After removing the solvent from the wet-ground suspension by steam distillation, a 20% solution of hydrochloric acid was added until the hydrochloric acid concentration in the aqueous slurry was 1 to 2%. The mixture was then stirred for 1 hour at 80° to 90° C., and then filtered. The obtained filtered cake was washed sufficiently with hot water, and dried to obtain a beta-type copper phthalocyanine pigment.

The specific surface area of the resulting beta-type copper phthalocyanine pigment was measured by BET method and found to be 37 $m^2/g$. The specific surface area of the crude beta-type copper phthalocyanine which was employed as the starting material indicated 6 $m^2/g$.

When the obtained pigment is tested by rubout on a Hoover muller (manufactured by Toyo Seiki KK) in MG-63 varnish used for lithographic purposes, the relative tinting strength of this ink is found to be about 92% compared to the ink made by using Fastogen Blue FGF (produced by Dainippon Ink and Chemicals) in the same manner.

Example 2

Crude beta-type copper phthalocyanine was obtained in the same manner as set forth in Example 1 above, with the exception that decalin (an aliphatic hydrocarbon type organic solvent having from 10 to 13 carbon atoms) was employed in place of Hyzole P, and the suspension was wet-ground to obtain a beta-type copper phthalocyanine pigment in the same manner as Example 1.

The specific surface area of the resulting beta-type copper phthalocyanine pigment was measured by BET method and found to be 43 $m^2/g$. The specific surface area of the crude beta-type copper phthalocyanine which was employed as the starting material indicated 7 $m^2/g$.

The relative tinting strength of the obtained beta-type copper phthalocyanine pigment was evaluated using the same method as employed in Example 1, and found to be 104%.

Example 3

Crude Beta-type copper phthalocyanine was obtained in the same manner as set forth in Example 1 above, with the exception that nitrobenzene was employed in place of Hyzole P. beta-type copper phthalocyanine pigment was then obtained in the same way as in Example 1, with the exception that the obtained reaction mixture was cooled to below 60° C., transferred to another vessel having dissolver, and diluted by adding nitrobenzene until the concentration of the crude beta-type copper phthalocyanine was reached to 20% with dispersing.

The specific surface area of the obtained beta-type copper phthalocyanine pigment was measured by BET method and found to be 40 $m^2/g$. The specific surface area of the crude beta-type copper phthalocyanine which was employed as the starting material indicated 5 $m^2/g$.

The relative tinting strength of the obtained beta-type copper phthalocyanine pigment was evaluated using the same method as employed in Example 1, and found to be 102%.

Example 4

Crude beta-type copper phthalocyanine was obtained in the same manner as set forth in Example 1 above, with the exception that trichlorobenzene was employed in place of Hyzole P, and then the suspension was wet-ground to obtain a beta-type copper phthalocyanine pigment in the same manner as set forth in Example 1 above.

The specific surface area of the resulting beta-type copper phthalocyanine pigment was measured by BET method and found to be 40 $m^2/g$. The specific surface area of the crude beta-type copper phthalocyanine which was employed as the starting material indicated 9 $m^2/g$.

The relative tinting strength of the obtained beta-type copper phthalocyanine pigment was evaluated using the same method as employed in Example 1, and found to be 106%.

Example 5

A reaction mixture containing crude beta-type copper phthalocyanine was produced in the same manner as set forth in Example 2 above, and diluted by adding decalin until the concentration of the crude beta-type copper phthalocyanine was reached to 20% with dispersing.

Beta-type copper phthalocyanine pigment was then obtained in the same manner as set forth in Example 1, with the exception that the obtained suspension was wet-ground by passing the suspension 5 times through a bead mill sold by Eiger Japan (Mini Motor Mill M-5) containing zirconium beads with an average diameter of 0.50 mm.

The specific surface area of the resulting beta-type copper phthalocyanine pigment was measured by BET method and found to be 42 $m^2/g$. The specific surface area of the crude beta-type copper phthalocyanine which was employed as the starting material indicated 7 $m^2/g$.

The relative tinting strength of the obtained beta-type copper phthalocyanine pigment was evaluated using the same method as employed in Example 1, and found to be 100%.

Example 6

A beta-type copper phthalocyanine pigment was obtained in the same way as set forth in Example 1, with the exception that filtration was employed in place of steam distillation to remove the organic solvent from the suspension obtained after wet grinding, with the wet cake of beta-type copper phthalocyanine pigment then washed with acetone, rinsed with water and dried.

The specific surface area of the obtained beta-type copper phthalocyanine pigment was measured by BET method and found to be 45 $m^2/g$.

The relative tinting strength of the resulting beta-type copper phthalocyanine pigment was evaluated using the same method as employed in Example 1, and found to be 101%.

Example 7

A beta-type copper phthalocyanine pigment was obtained in the same way as set forth in Example 1, with the exception that distillation under reduced pressure was employed in place of steam distillation to remove the organic solvent from the suspension obtained after wet grinding. The obtained powdered pigment was then dispersed in a 1 to 2% aqueous solution of hydrochloric acid, and then stirred for one hour at 80° to 90° C. Next, the aqueous slurry was suction filtered, and the residue was washed with water and dried, to obtain the beta-type copper phthalocyanine pigment.

The specific surface area of the obtained beta-type copper phthalocyanine pigment was measured by BET method and found to be 38 $m^2/g$.

The relative tinting strength of the obtained beta-type copper phthalocyanine pigment was evaluated using the same method as employed in Example 1, and found to be 100%.

Comparative Example 1

The crude copper phthalocyanine was obtained by distillation of organic solvent under reduced pressure from the same reaction mixture employed in Example 1 and was washed with 1% aqueous solution of sodium hydroxide and 1% aqueous solution of hydrochloric acid, and dried.

The obtained crude beta-type copper phthalocyanine was dispersed in adequate amount of Hyzole P, to obtain a suspension with 10% concentration of crude beta-type copper phthalocyanine.

Beta-type copper phthalocyanine pigment was obtained in the same manner as set forth in Example 1 above, with the exception that this suspension was employed as the suspension used in wet grinding.

The relative tinting strength of the obtained beta-type copper phthalocyanine pigment was evaluated using the same method as employed in Example 1, and found to be 87%.

Example 8

Crude beta-type copper phthalocyanine was obtained in the same manner as Example 1, with the exception that 121 parts of phthalic anhydride and 1.6 parts of trimellitic anhydride were used in place of the 122 parts of phthalic anhydride. Beta-type copper phthalocyanine pigment was then obtained in the same manner as above.

The specific surface area of the obtained beta-type copper phthalocyanine pigment was measured by BET method and found to be 58 $m^2/g$. The specific surface area of the crude beta-type copper phthalocyanine which was employed as the starting material indicated 10 $m^2/g$.

The relative tinting strength of the obtained beta-type copper phthalocyanine pigment was evaluated using the same method as employed in Example 1, and found to be 107%.

Example 8 differs from Example 1 with respect to employing aromatic polybasic carboxylic acid represented by general formula (I) in the step of synthesizing the crude copper phthalocyanine. The specific surface area of the beta-type copper phthalocyanine pigment obtained in Example 8 is 57% larger as compared to the specific surface area of the beta-type copper phthalocyanine pigment produced in Example 1 in which an aromatic polybasic carboxylic acid was not used. Accordingly, the particles of the pigment produced in Example 8 are fine. As a result, the tinting property is improved of about 15 percentage points.

Example 9

Crude beta-type copper phthalocyanine was obtained in the same manner as Example 1, with the exception that 118 parts of phthalic anhydride and 2.8 parts of pyromellitic anhydride were used in place of the 122 parts of phthalic anhydride. Beta-type copper phthalocyanine pigment was then obtained in the same manner as above.

The specific surface area of the obtained beta-type copper phthalocyanine pigment was measured by BET method and found to be 60 $m^2/g$. The specific surface area of the crude beta-type copper phthalocyanine which was employed as the starting material indicated 18 $m^2/g$.

The relative tinting strength of the obtained beta-type copper phthalocyanine pigment was evaluated using the same method as employed in Example 1, and found to be 110%.

Example 10

Crude beta-type copper phthalocyanine was obtained in the same manner as Example 1, with the exception that 119 parts of phthalic anhydride and 4 parts of trimellitic anhydride were used in place of the 122 parts of phthalic anhydride, and that nitrobenzene was used in place of Hyzole P. Beta-type copper phthalocyanine pigment was then obtained in the same manner as above.

The specific surface area of the obtained beta-type copper phthalocyanine pigment was measured with the BET method and found to be 63 $m^2/g$. The specific surface area of the crude beta-type copper phthalocyanine which was employed as the starting material was 11 $m^2/g$.

The relative tinting strength of the obtained beta-type copper phthalocyanine pigment was evaluated using the same method as employed in Example 1, and found to be 108%.

Example 11

Crude beta-type copper phthalocyanine was obtained in the same manner as Example 1, with the exception that 121 parts of phthalic anhydride and 1.6 parts of trimellitic anhydride were used in place of the 122 parts of phthalic anhydride, and that nitrobenzene was used in place of Hyzole P. Beta-type copper phthalocyanine pigment was then obtained in the same manner as Example 1, with the exception that the obtained reaction mixture was cooled to below 60° C., transferred to another vessel having dissolver, and diluted by adding nitrobenzene until the concentration of crude beta-type copper phthalocyanine was reached to 20% with dispersing.

The specific surface area of the obtained beta-type copper phthalocyanine pigment was measured by BET method and found to be 54 $m^2/g$. The specific surface area of the crude beta-type copper phthalocyanine which was employed as the starting material indicated 9 $m^2/g$.

The relative tinting strength of the obtained beta-type copper phthalocyanine pigment was evaluated using the same method as employed in Example 1, and found to be 102%.

Example 12

Crude beta-type copper phthalocyanine was obtained in the same manner as Example 1, with the exception that 121 parts of phthalic anhydride and 1.6 parts of trimellitic anhydride were used in place of the 122 parts of phthalic anhydride, and that decalin was used in place of Hyzole P. Beta-type copper phthalocyanine pigment was then obtained in the same manner as Example 1.

The specific surface area of the obtained beta-type copper phthalocyanine pigment was measured by BET method and found to be 57 $m^2/g$. The specific surface area of the crude beta-type copper phthalocyanine as the starting material indicated 9 $m^2/g$.

The relative tinting strength of the obtained beta-type copper phthalocyanine pigment was evaluated using the same method as employed in Example 1, and found to be 106%.

Example 13

Crude beta-type copper phthalocyanine was obtained in the same manner as Example 1, with the exception that 117 parts of phthalic anhydride and 3.2 parts of trimellitic anhydride were used in place of the 122 parts of phthalic anhydride, and that trichlorobenzene was used in place of Hyzole P. Beta-type copper phthalocyanine pigment was then obtained in the same manner as Example 1.

The specific surface area of the obtained beta-type copper phthalocyanine pigment was measured by BET method and found to be 58 $m^2/g$. The specific surface area of the crude beta-type copper phthalocyanine which was employed as the starting material indicated 11 $m^2/g$.

The relative tinting strength of the obtained beta-type copper phthalocyanine pigment was evaluated using the same method as employed in Example 1, and found to be 110%.

Example 14

Crude beta-type copper phthalocyanine was obtained in the same manner as Example 1, with the exception that 118 parts of phthalic anhydride, 4.8 parts of trimellitic anhydride, and 2.0 parts of pyromellitic anhydride were used in place of the 122 parts of phthalic anhydride, and that nitrobenzene was used in place of Hyzole P. Beta-type copper phthalocyanine pigment was then obtained in the same manner as Example 1.

The specific surface area of the obtained beta-type copper phthalocyanine pigment was measured by BET method and found to be 64 m²/g. The specific surface area of the crude beta-type copper phthalocyanine which was employed as the starting material indicated 18 m²/g.

The relative tinting strength of the obtained beta-type copper phthalocyanine pigment was evaluated using the same method as employed in Example 1, and found to be 115%.

Example 15

A beta-type copper phthalocyanine pigment was obtained in the same way as set forth in Example 8, with the exception that filtration was employed in place of steam distillation to remove the organic solvent from the suspension obtained after wet grinding. The obtained filtered cake after the filtration was washed with acetone and washed with water, and next, the cake was dispersed in 1% aqueous solution of hydrochloric acid, and stirred for one hour at 80° to 90° C. The aqueous slurry was then filtered, washed with water and dried.

The specific surface area of the obtained beta-type copper phthalocyanine pigment was measured by BET method and found to be 64 m²/g.

The relative tinting strength of the obtained beta-type copper phthalocyanine pigment was evaluated using the same method as employed in Example 1, and found to be 99%.

What is claimed:

1. A production method for beta-type copper phthalocyanine pigment comprising the steps of:

producing a reaction mixture in an organic solvent, the reaction mixture containing crude copper phthalocyanine and the organic solvent;

wet grinding the obtained reaction mixture without removing the organic solvent by mechanical energy to reduce the particle size of the crude copper phthalocyanine to form a suspension; and removing the organic solvent from the obtained suspension.

2. A production method of beta-type copper phthalocyanine pigment according to claim 1, wherein the reaction mixture containing the crude copper phthalocyanine and the organic solvent is obtained by reacting phthalic anhydride or its derivatives, copper or its compounds, and urea or its derivatives by heating in the presence of a catalyst in an organic solvent.

3. A production method of beta-type copper phthalocyanine pigment according to claim 1, wherein the reaction mixture containing the crude copper phthalocyanine is obtained by reacting phthalic anhydride or its derivatives, copper or its compounds, urea or its derivatives, and an aromatic polybasic carboxylic acid or its derivatives represented by general formula (I) below, by heating in an organic solution in the presence of a catalyst;

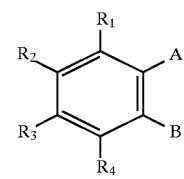

(where: $R_1$~$R_4$ are each independently one compound selected from the group consisting of hydrogen atom, carboxyl group, alkoxy carbonyl group, carbamoyl group and carboxylate group, with at least one of $R_1$~$R_4$ being one compound selected from the group consisting of a carboxyl group, alkoxy carbonyl group, carbamoyl group, and carboxylate group, wherein when 2 or more of these groups are adjacent to one another, they may cyclize to form an imide or anhydride; and A and B independently represent one compound selected from the group consisting of a carboxyl group, alkoxy carbonyl group, carbamoyl group, carboxylate group, and nitrile group, wherein A and B may cyclize to form an imide or anhydride).

4. A production method of beta-type copper phthalocyanine pigment according to claim 3, wherein the molar ratio between the total phthalic acid and its derivatives used and the total aromatic polybasic carboxylic acid and its derivatives used is in the range from 90:10 to 99.7:0.3.

5. A production method of beta-type copper phthalocyanine pigment according to claim 3, wherein the aromatic polybasic carboxylic acid or its derivatives is a compound selected from the group consisting of trimellitic acid, pyromellitic acid, and their derivatives.

6. A production method of beta-type copper phthalocyanine pigment according to claim 3,
   wherein the aromatic polybasic carboxylic acid or its derivatives is a compound selected from the group consisting of trimellitic acid, pyromellitic acid, and their derivatives, and
   wherein the molar ratio between the total phthalic acid and its derivatives used and the total aromatic polybasic carboxylic acid and its derivatives used is in the range from 90:10 to 99.7:0.3.

7. A production method of beta-type copper phthalocyanine pigment according to claim 2, wherein the average diameter of the grinding medium used in wet grinding is in the range of 0.10 to 1.00 mm.

8. A production method of beta-type copper phthalocyanine pigment according to claim 3, wherein the average diameter of the grinding medium used in wet grinding is in the range of 0.10 to 1.00 mm.

9. A production method of beta-type copper phthalocyanine pigment according to claim 2, wherein the concentration of the crude copper phthalocyanine in the suspension during wet grinding is in the range of 5 to 40% by weight.

10. A production method of beta-type copper phthalocyanine pigment according to claim 3, wherein the concentration of the crude copper phthalocyanine in the suspension during wet grinding is in the range of 5 to 40% by weight.

11. A production method of beta-type copper phthalocyanine pigment according to claim 2, wherein the reaction mixture containing crude copper phthalocyanine and the organic solvent used in the reaction are diluted with an organic solvent and then wet-ground.

12. A production method of beta-type copper phthalocyanine pigment according to claim 3, wherein the reaction mixture containing crude copper phthalocyanine and the organic solvent used in the reaction are diluted with an organic solvent and then wet-ground.

13. A production method of beta-type copper phthalocyanine pigment according to claim 2, wherein steam distillation is used to remove the organic solvent.

14. A production method of beta-type copper phthalocyanine pigment according to claim 3, wherein steam distillation is used to remove the organic solvent.

15. A production method of beta-type copper phthalocyanine pigment according to claim 4, wherein steam distillation is used to remove the organic solvent.

16. A production method of beta-type copper phthalocyanine pigment according to claim 5, wherein steam distillation is used to remove the organic solvent.

17. A production method of beta-type copper phthalocyanine pigment according to claim 7, wherein steam distillation is used to remove the organic solvent.

18. A production method of beta-type copper phthalocyanine pigment according to claim 8, wherein steam distillation is used to remove the organic solvent.

19. A production method of beta-type copper phthalocyanine pigment according to claim 9, wherein steam distillation is used to remove the organic solvent.

20. A production method of beta-type copper phthalocyanine pigment according to claim 10, wherein steam distillation is used to remove the organic solvent.

21. A production method of beta-type copper phthalocyanine pigment comprising the steps of;

producing a reaction mixture in an organic solvent, the reaction mixture containing crude copper phthalocyanine and the organic solvent;

wet grinding the reaction mixture by mechanical energy to reduce the particle size of the crude copper phthalocyanine to form a suspension; and removing the organic solvent from the obtained suspension wherein the reaction mixture containing the crude copper phthalocyanine is obtained by reacting phthalic anhydride or its derivatives, copper or its compounds, urea or its derivatives, and an aromatic polybasic carboxylic acid or its derivatives represented by general formula (I) below, by heating in an organic solution in the presence of a catalyst;

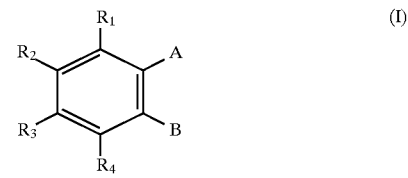

where $R_1$~$R_4$ are each independently one compound selected from the group consisting of hydrogen atom, carboxyl group, alkoxy carbonyl group, carbamoyl group and carboxylate group, with at least one of $R_1$~$R_4$ being one compound selected from the group consisting of a carboxyl group, alkoxy carbonyl group, carbamoyl group, and carboxylate group, wherein when 2 or more of these groups are adjacent to one another, they may cyclize to form an imide or anhydride; and A and B independently represent one compound selected from the group consisting of a carboxyl group, alkoxy carbonyl group, carbamoyl group, carboxylate group, and nitrile group, wherein A and B may cyclize to form an imide or anhydride.

* * * * *